United States Patent
Krammer

(10) Patent No.: US 8,846,227 B2
(45) Date of Patent: Sep. 30, 2014

(54) COOLING/HEATING ELEMENT FOR A RECHARGEABLE BATTERY

(75) Inventor: Gert Krammer, Graz (AT)

(73) Assignee: Magna Steyr Battery Systems GmbH & Co. OG, Zettling (AT)

( * ) Notice: Subject to any disclaimer, the term of this patent is extended or adjusted under 35 U.S.C. 154(b) by 0 days.

(21) Appl. No.: 13/516,830

(22) PCT Filed: Dec. 17, 2010

(86) PCT No.: PCT/EP2010/070151
§ 371 (c)(1),
(2), (4) Date: Jul. 3, 2012

(87) PCT Pub. No.: WO2011/073424
PCT Pub. Date: Jun. 23, 2011

(65) Prior Publication Data
US 2012/0263984 A1    Oct. 18, 2012

(51) Int. Cl.
| | | |
|---|---|---|
| H01M 10/50 | (2006.01) | |
| H01M 2/12 | (2006.01) | |
| H01M 10/625 | (2014.01) | |
| H01M 10/6557 | (2014.01) | |
| H01M 10/6555 | (2014.01) | |
| H01M 10/6556 | (2014.01) | |
| H01M 10/6554 | (2014.01) | |
| H01M 10/647 | (2014.01) | |
| H01M 10/613 | (2014.01) | |
| H01M 10/615 | (2014.01) | |

(52) U.S. Cl.
CPC ...... *H01M 10/5004* (2013.01); *H01M 10/5016* (2013.01); *H01M 2/12* (2013.01); *H01M 10/5059* (2013.01); *Y02E 60/12* (2013.01); *H01M 10/5055* (2013.01); *H01M 10/5057* (2013.01); *H01M 10/5053* (2013.01); *H01M 10/5032* (2013.01); *H01M 10/5006* (2013.01)
USPC ............................................. 429/82; 429/120

(58) Field of Classification Search
None
See application file for complete search history.

(56) References Cited

U.S. PATENT DOCUMENTS

| | | | |
|---|---|---|---|
| 7,435,501 B2 * | 10/2008 | Peace et al. ................... | 429/435 |
| 2002/0195237 A1 * | 12/2002 | Luz et al. ...................... | 165/153 |
| 2007/0026301 A1 * | 2/2007 | Lee et al. ...................... | 429/120 |

FOREIGN PATENT DOCUMENTS

| | | |
|---|---|---|
| EP | 1 271 085 | 1/2003 |
| EP | 1 577 966 | 9/2005 |
| JP | 2009 009889 | 1/2009 |

OTHER PUBLICATIONS

U.S. Appl. No. 12/842,478, filed Jul. 2012, Kumar et al.*

* cited by examiner

*Primary Examiner* — Patrick Ryan
*Assistant Examiner* — Christopher Domone
(74) *Attorney, Agent, or Firm* — Jordan IP Law, LLC; Todd A. Vaughn

(57) ABSTRACT

A cooling/heating element for a rechargeable battery, the cooling/heating element including a cooling area having a first boundary which physically contacts a first cell of the rechargeable battery, and a second boundary which physically contacts a second cell of the rechargeable battery. The cooling/heating element can be stacked and also include an inlet and/or outlet which interacts with an inlet and/or outlet of an adjacent cooling/heating element in a stack.

17 Claims, 14 Drawing Sheets

COOLING/HEATING ELEMENT FOR A RECHARGEABLE BATTERY

CROSS-REFERENCE TO RELATED APPLICATIONS

The present application is a National Stage Application of PCT International Application No. PCT/EP2010/070151 (filed on Dec. 17, 2010), under 35 U.S.C. §371, which claims priority to German Patent Application No. 10 2009 058 860.4 (filed on Dec. 18, 2009), which are each hereby incorporated by reference in their respective entireties.

FIELD OF THE INVENTION

The invention relates to a cooling/heating element for a rechargeable battery.

BACKGROUND OF THE INVENTION

Electrical and electronic devices which can be operated independently of a power supply system are increasingly being used at the present time. In this case, ever more powerful rechargeable batteries are required on account of ever more powerful devices and the desire to provide as long an operating time as possible. Said rechargeable batteries should generally be as small and lightweight as possible yet have a high energy content. Great efforts have recently been made in order to be able to meet these contradictory requirements which arise in the construction of electric motor vehicles in particular. Nonetheless, there is still potential for improvement in the field of rechargeable battery technology.

SUMMARY OF THE INVENTION

The object of the present invention is therefore to specify an improved rechargeable battery or cooling/heating element for a rechargeable battery, in particular a rechargeable battery for an electric vehicle.

The invention is achieved by a cooling/heating element for a rechargeable battery, comprising a cooling area having a first boundary, which is intended to make physical contact with a first cell of the rechargeable battery, and a second boundary, which is intended to make physical contact with a second cell of the rechargeable battery, it being possible for the cooling/heating element to be stacked, and said cooling/heating element comprising an inlet and/or outlet which interact/interacts with an inlet and/or outlet of an adjacent cooling/heating element in a stack.

The cells of a rechargeable battery generate heat loss during operation, said heat loss generally being captured by means of the large thermal mass of the cells themselves. Therefore, active cooling is usually required only at very high outside temperatures or in the case of a very long operating time of a rechargeable battery or when "power cells" are used, for example in a hybrid vehicle, said "power cells" being charged and discharged several times within a few minutes (the thermal mass very quickly becomes insufficient in this case). In contrast, heating is advantageous even at moderately low temperatures since the chemical reactivity of most cell types is exhaustible.

Furthermore, in addition to being used for the cells, the cooling/heating elements can, of course, also be used to control the temperature of other components in the rechargeable battery, for example for heating/cooling electronic assemblies.

the invention, the inlets and outlets of the individual elements form an inlet and outlet which can extend over the entire stack without separate piping being required for this purpose. The assembly of the rechargeable battery is therefore particularly simple, in particular when a seal is extruded directly onto the cooling/heating element. However, the seal can also be designed as a separate part. Both seals which are composed of the same material as the cooling/heating element and also seals which are composed of another material are possible in both cases.

Finally, the cooling/heating elements form, as it were, "fire walls" between the individual cells. A so-called "thermal runaway" can be produced in the event of overheating, excessive charging or some other improper use. In this case, all the chemical and electrical energy which is stored in a cell is converted within 5 to 25 seconds. This creates very high local temperatures of greater than 700° C. which can ignite the adjacent cells on account of the high packing density of the cells. In this case, the cooling/heating elements prevent heat and fire from spreading to adjacent cells which have not yet been affected by the thermal runaway.

Advantageous refinements and developments of the invention can be gathered from the dependent claims and from the description together with the figures in the drawing.

It is advantageous when the inlet and/or outlet of the cooling/heating element interacts directly with the inlet and/or outlet of an adjacent cooling/heating element. As a result, when a plurality of cooling/heating elements in accordance with the invention are stacked, the inlets and/or outlets of the individual cooling/heating elements form a common inlet and/or outlet which extends over the stack of cooling/heating elements. As a result, further connecting elements between the individual inlets and/or outlets, for example piping, are not required.

It is advantageous when the two boundaries of the cooling/heating element are elastically connected to one another. The volume of a cell varies depending on the state of charge. In accordance with the invention, the cooling/heating element can heat or cool the cells as required and also compensate for fluctuations in the volume of the cells and exert compressive forces on the cells. These compressive forces serve, amongst other things, to fix the cells which are generally located in a plastic bag. Overall, the individual cooling/heating elements in the stack form a very stable rechargeable battery housing.

In the case of a cooling/heating element in accordance with the invention, it is advantageous when elastic webs for connecting the first and the second boundary are provided in the interior of the cooling/heating element in the region of the cooling area. This provides both good cohesion of the cooling/heating element and also the option of changing the volume of the cooling/heating element.

In the case of a cooling/heating element in accordance with the invention, it is advantageous when the webs run in a straight line from the first to the second boundary, in particular when they are substantially normal to the boundary surfaces. This provides a particularly simple and cost-effective design of the webs.

In the case of a cooling/heating element in accordance with the invention, it is advantageous when the webs have curved regions, that is to say, for example, one or more bends or loops per web. On account of these curved regions, the webs can be easily deformed, and therefore, the resistance to a change in volume is only low.

In the case of a cooling/heating element in accordance with the invention, it is particularly advantageous when the webs are of meandering design. On account of the meandering shape, the webs can be easily deformed, and therefore the resistance to a change in volume is only low. Furthermore, the meandering shape has the effect that a certain minimum distance is kept between the boundaries in the event of compression of the cooling/heating element since, in the event of excessive compression, the limbs of an arc of a meander come to rest against one another and cannot be pressed together again or can be pressed together again only with the application of a considerable amount of force.

In the case of a cooling/heating element in accordance with the invention, it is advantageous when the webs run obliquely from the first boundary to the second boundary. The resistance to a change in volume is only low in this case too. Equally, a minimum distance is likewise kept between the boundaries of the cooling/heating element in the event of excessive compression of said cooling/heating element, said minimum distance in this case corresponding approximately to the thickness of the web.

In the case of a cooling/heating element in accordance with the invention, it is advantageous when spacer protrusions are provided in the region of the cooling area, in particular without connecting the first boundary surface to the second boundary surface. A minimum distance can likewise be kept between the boundaries of the cooling/heating element in this way, in particular when elastic webs are dispensed with for the sake of simpler manufacture. The protrusions can be arranged on one side or two sides in this case.

In the case of a cooling/heating element in accordance with the invention, it is advantageous when a rigid edge is provided, said rigid edge being elastically connected to the boundaries of the cooling/heating element. The rigid edge makes it possible for the cooling/heating elements to be stacked effectively. Furthermore, said rigid edge can accommodate the inlet and outlet channels for the cooling medium. Finally, the rigid edge ensures secure positioning of the cells during assembly of the rechargeable battery. If the rechargeable battery is completed, the cooling/heating elements, in association, form a housing for all the cells and fix each cell separately.

In the case of a cooling/heating element in accordance with the invention, it is advantageous when the rigid edge is at least as high as a cell, the thickness of the boundaries and a minimum distance between the boundaries. In this case, the rigid edge also ensures that a certain minimum distance is kept between the individual cooling/heating elements. In this way, it is possible to ensure that the individual cooling/heating elements of a stack are compressed or widened more or less to an equal extent. Therefore, large local differences in the cooling/heating power can be avoided.

In the case of a cooling/heating element in accordance with the invention, it is advantageous when a flow diaphragm is provided at the edge of the cooling area, said flow diaphragm ensuring a substantially constant inlet or outlet of a cooling/heating medium irrespective of the distance between the first and the second boundary. A constant inlet and/or outlet likewise contributes to the cooling/heating power within the rechargeable battery not varying too much.

In the case of a cooling/heating element in accordance with the invention, it is advantageous when a flow diaphragm is provided at the edge of the cooling area, said flow diaphragm restricting an inlet of a cooling/heating medium as the distance between the first and the second boundary increases. In this variant, the inlet is restricted as the distance between the first and the second boundary increases and is increased as the distance decreases. In this way, the pressure in the cooling area is controlled to the effect that a decreasing pressure counteracts a further increase in the distance between the boundaries, and vice versa.

In the case of a cooling/heating element in accordance with the invention, it is advantageous when a flow diaphragm is provided at the edge of the cooling area, said flow diaphragm restricting an outlet of a cooling/heating medium as the distance between the first and the second boundary decreases. In this variant, the outlet is increased as the distance between the first and the second boundary increases and is restricted as the distance decreases. In this way, the pressure in the cooling area is controlled to the effect that a decreasing pressure counteracts a further increase in the distance between the boundaries, and vice versa. It goes without saying that this variant can also be combined with the abovementioned variant of a controlled inlet.

In the case of a cooling/heating element in accordance with the invention, it is advantageous when it has a tooth system at its boundary surfaces which are provided for stacking. The tooth system helps to transfer pushing forces within the stack, that is to say transverse to the stack or to the edge of said stack, and therefore to stabilize said stack. If the tooth system is of asymmetrical design, it can also prevent the cooling/heating elements from being stacked in an incorrect or skewed manner.

In the case of a cooling/heating element in accordance with the invention, it is also advantageous when said cooling/heating element comprises at least one channel, which is cooled by a cooling medium, for discharging hot combustion gases from a cell. As already mentioned, a so-called "thermal runaway" can be produced in the event of overheating, excessive charging or some other improper use. In order to prevent spreading to other cells, the channel, which is cooled by a cooling medium, for discharging hot combustion gases is advantageously provided. A plurality of channels can also be provided in order to improve heat discharge.

The object of the invention is also achieved by way of a volume compensation arrangement, specifically by a volume compensation arrangement of a cooling/heating medium (or for the combination of cooling/heating elements) of a rechargeable battery comprising a flexible housing on which prestressed plate springs act, or by a volume compensation arrangement for a cooling/heating medium of a rechargeable battery comprising a rigid housing in which a flexible housing is arranged, prestressed elastic elements, in particular plate springs, acting on said flexible housing.

As already mentioned, the volume of the cells of rechargeable batteries varies depending on the state of charge and the temperature. This is therefore generally accompanied by a change in volume of the cooling/heating elements which adjoin the cells. A volume compensation arrangement in accordance with the invention now makes said changes in volume possible since the cooling medium usually used is a liquid which, unlike gases for example, is compressible. The elastic elements used are, of course, all types of springs, in particular including helical springs, and also elastic plastic foams, for example.

In the case of a volume compensation arrangement, it is advantageous when the elastic elements, in particular plate springs, are operated in a region in which the force is substantially independent of the spring travel. In this way, a substantially constant pressure can be achieved in the rechargeable battery independently of the extent of the cells.

The invention is also achieved by a cooling medium, specifically a cooling medium for a cooling/heating element in accordance with the invention which has an anti-freeze and/or a surfactant and/or a corrosion-prevention agent added.

The addition of surfactants in particular provides the cooling medium with a dirt- and air bubble-releasing effect. As a result, dirt and air bubbles in the cooling medium are released and removed from the capillaries of the cooling/heating elements. This air bubble- and dirt-releasing effect also makes it possible for the inflow and outflow to also be arranged on the lower face in a horizontally installed rechargeable battery. In this case, the air bubbles cannot collect or accumulate in the relatively high regions of the cooling elements—said air bubbles are washed out given a sufficient flow rate. The cooling effect therefore remains uniform over the entire cooling area.

Furthermore, the invention is achieved by a cell for a rechargeable battery, specifically a cell for a rechargeable battery of which the connection lug is bent in such a way that it comes to rest on the connection lug of another cell when said cell is stacked on another cell.

In accordance with the invention, "left-hand" and "right-hand" cells are each stacked one above the other in order to obtain a desired total capacity or voltage. In this case, the connection lugs come to rest one above the other, and therefore the cells can be connected without further connecting wires or connecting webs. The connection lugs can therefore be directly soldered or welded (for example, by ultrasound welding or ultrasound compaction) to one another or connected by chemical reaction. Lining up cells, in particular in a series circuit, is therefore particularly simple. When the cells are connected in parallel, (a small number of) additional connecting brackets may need to be provided. A complex design using bimetal can usually be dispensed with in this case.

In the case of a cell, it is advantageous when said cell additionally comprises a connection lug for connecting a temperature and/or voltage sensor. A temperature and/or voltage sensor can be connected in a particularly simple manner in this way.

Finally, the object of the invention is achieved by a rechargeable battery, specifically by a rechargeable battery comprising a base element which is arranged in a stack, a cover element and at least one cooling/heating element in accordance with the invention between the base element and the cover element and also at least a first and a second cell which adjoin the cooling/heating element in the interior of the stack.

A typical battery construction usually requires a plurality of cells which are connected in series in order to obtain a desired output voltage. 100 or more cells are often required. In accordance with the prior art, 12 cells, for example, can be combined to form a module and then 8 modules can be lined up in order to obtain a desired voltage. In order to achieve various capacitances and/or voltages of a rechargeable battery, the invention now proposes providing a stack of cells (for example 50 to 70 cells) with cooling/heating elements situated therebetween. Therefore, a rechargeable battery can be produced in a particularly flexible manner since it is not necessary to rely on modules with 12 cells and multiples thereof, but rather individual cells can also be added and removed. An electronic circuit which is provided for monitoring the cells can, of course, also monitor smaller groups comprising 50 to 70 cells, but these circuits are preferably combined in an electronic assembly.

In the case of a rechargeable battery in accordance with the invention, it is advantageous when the medium in the cooling/heating element is pressurized. The cells of the rechargeable battery do not necessarily have a rigid external housing, but rather are partially embedded only in relatively soft plastic sheaths. For this reason, the cells generally require an outside pressure, typically of up to 2 bar, in order to function correctly.

In the case of a rechargeable battery in accordance with the invention, is it advantageous when a fire-proof material, in particular a fire-resistant nonwoven, a fire-resistant woven or a fire-resistant paper, is arranged between a boundary of a cooling/heating element and a cell. In the event of a defect or improper use of the rechargeable battery, individual cells may "burn out," it being possible for these cells, on account of the development of a large amount of heat, to also ignite the neighboring cells and therefore destroy the entire rechargeable battery. In order to counteract this chain reaction, a fire-proof layer is advantageously arranged between a cell and a cooling/heating element in such a way that the fire-proof material reduces a large proportion of the temperature gradient down to the surface of the cooling element. This prevents thermal damage to a cooling/heating element which adjoins a cell which is affected by the thermal runaway.

In the case of a rechargeable battery in accordance with the invention, it is advantageous when the surface of the base element and/or cover element is curved toward the outside, in particular with a central indentation. Forces which are applied, for example, by a tensioning strap which is wound around the rechargeable battery can be introduced into the rechargeable battery in a particularly effective manner in this way. The indentation can advantageously be used to accommodate a tensioning lock.

In the case of a rechargeable battery in accordance with the invention, it is advantageous when a control element having an electronic control module is arranged in the stack, said control module being provided for controlling switching and measuring processes in the rechargeable battery. Modern rechargeable batteries often comprise circuits which are used to monitor and control said rechargeable batteries. In accordance with the invention, these control modules are integrated in one or more control elements which can be arranged, for example, within a stack of cooling/heating elements. The design of a rechargeable battery is therefore particularly simple.

In the case of a rechargeable battery in accordance with the invention, it is advantageous when the control element adjoins a cooling/heating element. In this way, the control element or the control module contained therein can be cooled, this being advantageous particularly when the control module contains elements of the power electronics system which sometimes switch very high powers. This control module can comprise, for example, a charging device for the rechargeable battery.

In the case of a rechargeable battery in accordance with the invention, it is also advantageous when a rechargeable battery disconnect unit and/or a rechargeable battery management unit are/is provided as control element. In this way, the two units most frequently used in the case of a rechargeable battery can be easily integrated in the rechargeable battery and also cooled.

In a rechargeable battery in accordance with the invention, it is advantageous when the electrical connections of the individual elements of the rechargeable battery lie substantially in one plane. In this way, the wiring of the rechargeable battery and the testing of said rechargeable battery, for example, when the rechargeable battery is defective, is particularly simple.

In the case of a rechargeable battery in accordance with the invention, it is advantageous when all the temperature and/or voltage sensors for monitoring the cells and/or circuit parts for balancing the cells are arranged on one printed circuit board. The design of the circuit for testing the cells of the rechargeable battery is therefore particularly simple.

In the case of a rechargeable battery in accordance with the invention, it is advantageous when temperature and/or voltage sensors for monitoring the cells and/or circuit parts for balancing the cells are arranged on different printed circuit boards and a potential-free communication connection is provided between the printed circuit boards. In this case, individual printed circuit boards are used for monitoring a cell or a group of cells, this complying with the desire for a modular design of the rechargeable battery. There is a voltage potential-bridging communication connection between the printed circuit boards, and therefore the sometimes high potential difference within a cell stack cannot lead to damage to or destruction of the components on the individual printed circuit boards. Communication can be performed in series from printed circuit board to printed circuit board or else from any printed circuit board to any other printed circuit board. Star-like communication with a central control device is also feasible. It goes without saying that mixed forms are also feasible.

In the case of a rechargeable battery in accordance with the invention, it is also advantageous when an optical data connection or a radio connection is provided as a potential-free communication connection. A voltage potential between the individual printed circuit boards can be bridged in a particularly effective manner in this way. This technique can also be used independently of further features which are cited in the application, therefore for any type of rechargeable battery.

In the case of a rechargeable battery in accordance with the invention, it is also advantageous when the electrical connections of the individual elements of the rechargeable battery are connected to a cell monitoring unit or a cell supervisory circuit. This unit, which is often used in a rechargeable battery, can be easily integrated in the rechargeable battery in this way.

In the case of a rechargeable battery in accordance with the invention, it is advantageous when a tensioning strap is arranged around the stack. Since the stack is relatively unstable without further measures and generally no pressure can be built up within the rechargeable battery, a tensioning strap is placed around the rechargeable battery in accordance with the invention, said tensioning strap holding said rechargeable battery together and moreover absorbing the internal compressive forces. It goes without saying that a plurality of tensioning straps can also be placed around the rechargeable battery. Tensioning straps for holding cells of a rechargeable battery together are known per se. By way of example, JP 2003323874A discloses, in this respect, an arrangement in which a plurality of cells is held together by a tensioning strap. However, in contrast to the present invention, the length of the stack and therefore the length of the strap vary in JP 2003323874A. In the case of the present invention, the length of the external strap remains the same however. Therefore, straps which are composed of materials with a comparatively high modulus of elasticity can be used. The coefficients of thermal expansion of these straps are preferably matched to the properties of thermal expansion of the stack.

In the case of a rechargeable battery in accordance with the invention, it is advantageous when the tensioning strap is composed of one of the following materials: rubber, metal, plastic, fiber-reinforced plastic. By way of example, rubber provides the advantage that the strap can be placed around the rechargeable battery without further measures and builds up a force there. In contrast, metals are not as elastic and are advantageously clamped and fixed by an apparatus. For this reason, metals can withstand substantially higher forces than rubber. Plastics provide a good compromise.

In the case of a rechargeable battery in accordance with the invention, it is advantageous when the tensioning strap has a tensioning lock. The straps can be effectively tensioned in this way, especially those which are composed of materials with a relatively high modulus of elasticity.

In the case of a rechargeable battery in accordance with the invention, it is advantageous when retaining tabs are provided, said retaining tabs being clamped between a tensioning strap and a base element or cover element. In order to be able to fix the rechargeable battery in a vehicle or a device which is to be supplied with energy, retaining tabs are advantageously clamped between the tensioning strap and a base element or cover element in this variant. In this way, the tabs can be arranged in various positions in a particularly simple manner and various retaining tabs can be used for rechargeable batteries which are otherwise physically identical. The rechargeable battery can therefore be matched particularly effectively to various installation situations.

In the case of a rechargeable battery in accordance with the invention, it is advantageous when tie elements, in particular threaded rods, which extend vertically above the stack and are intended to hold the stack together are provided. Threaded rods which are arranged vertically (that is to say transverse to the separating plane of the individual modules) are likewise highly suitable for stabilizing the stack and for absorbing the internal pressures of the rechargeable battery. They can also be matched very easily to stacks of various heights by simply being cut to length. The stack is then clamped together by a nut at the upper and at the lower end.

In the case of a rechargeable battery in accordance with the invention, it is advantageous when a bridge which extends horizontally over the stack is provided, in particular one which comprises flat material, a U-profile or a pipe profile which has elements for receiving the tie elements at the ends, in particular holes for receiving a threaded rod. If the rechargeable battery does not have any holes for receiving a threaded rod or else for better distribution of force, a bridge can be provided horizontally (that is to say in the direction of the separating plane of the individual modules) over the stack. An upper and a lower bridge are then again clamped with respect to one another with the aid of threaded rods and nuts and thus securely hold the stack together.

In the case of a rechargeable battery in accordance with the invention, it is advantageous when retaining tabs are provided which are clamped between a bridge and a base element or cover element. Retaining tabs can be used in this variant too. In this way, the tabs can again be arranged easily in various positions or various retaining tabs can be used for rechargeable batteries which are otherwise physically identical. The rechargeable battery can therefore be matched particularly effectively to various installation situations The above refinements and developments of the invention can be combined in any desired manner.

BRIEF DESCRIPTION OF THE DRAWINGS

The present invention will be explained in greater detail below with reference to the exemplary embodiments which are indicated in the schematic figures of the drawing, in which.

DETAILED DESCRIPTION OF EMBODIMENTS

Figure 1:
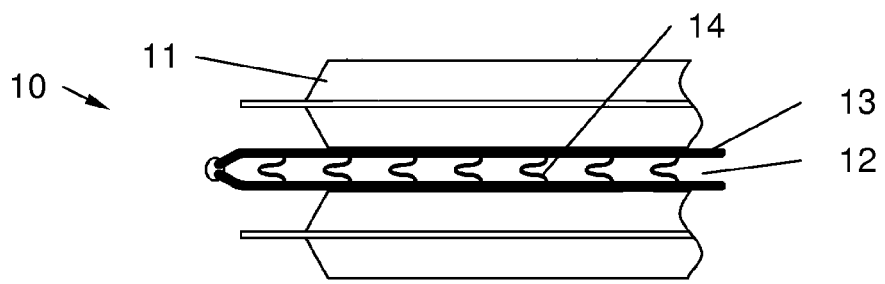
FIG. 1 illustrates a detail of a stack of individual cells with a cooling/heating plate situated therebetween.

Cooling:

For optimum functioning of the rechargeable battery, the cells of said rechargeable battery are cooled or heated in order to maintain an optimum operating temperature. If the cells of a rechargeable battery are of flat design, the temperature of said cells can be controlled by means of the comparatively large flat surfaces of the rechargeable battery. This can be achieved, for example, by aluminum plates which conduct the heat to the edge of the cell. A further option is plates or bags through which a cooling medium flows. In this respect, FIG. 1 illustrates a detail of a stack 10 of individual cells 11 between which a cooling/heating plate 12 is arranged in each case. The cooling/heating plate 12 has boundaries 13 which are connected to one another by means of flexible webs 14. In a specific embodiment of a stack 10 of this kind, a cooling water stream of approximately 3 g/s was provided for cooling, said cooling water stream flowing through an approximately 0.2 mm wide gap within the cooling/heating plate 12. A pressure drop of approximately 7 kPa is produced in the process. The same flow can also be used for heating the cells.

In order for the cooling/heating plate 12 to form a thermally conductive connection with the cells 11, the entire cooling water circuit can be pressurized (for example, pumped up to approximately 2 bar). In order for the pressing forces to be able to act in the cell, the boundaries 13 of the cooling/heating plate 12 should have a degree of freedom of movement. The boundaries 13 should therefore be connected to one another or have flexible webs only at the edge. Since the pressing forces are transferred directly to the cell, only a very thin material thickness, for example of 1 mm of plastic or 0.2 mm of sheet metal, is required for the boundaries 13 or walls.

Figure 2:
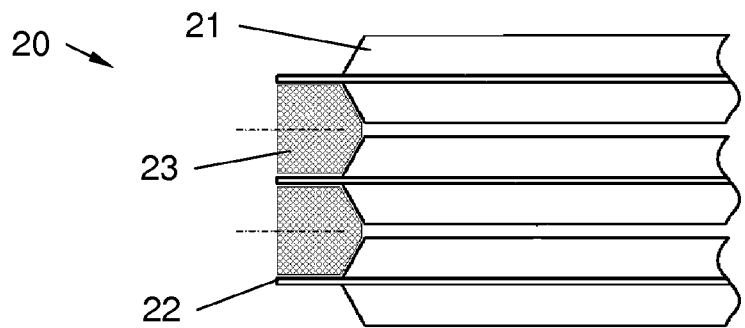
FIG. 2 illustrates a further detail of a stack of individual cells which each have a fold at their edge.

FIG. 2 illustrates a further detail of a stack 20 of individual cells 21 which each have a fold 22 at their edge. The space 23 between the cells 21 is advantageously used for supplying and/or discharging a cooling medium (also see FIGS. 3 and 5 in this respect).

Figure 3:
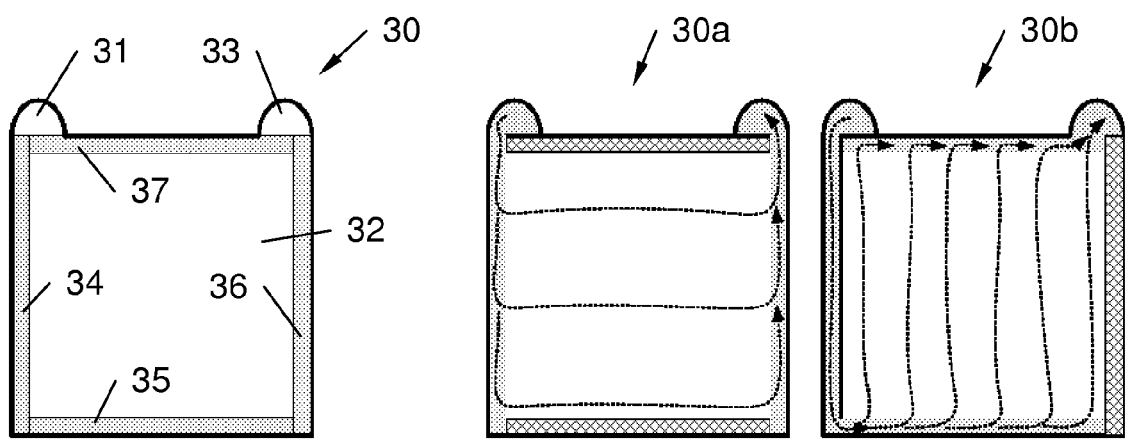
FIG. 3 illustrates a cooling/heating element from above.
Figure 4:
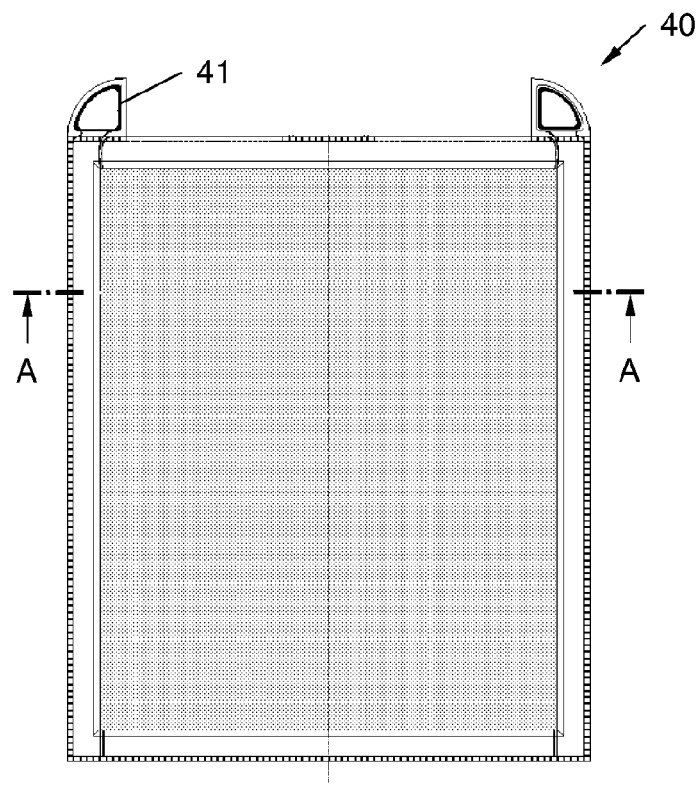
FIG. 4 illustrates a plan view of a cooling/heating element with an inserted or extruded seal.

FIG. 3 illustrates a cooling/heating element 30 from above. The cooling/heating element 30 comprises an inlet 31, a cooling area 32 and an outlet 33. Various options in respect of how the cooling medium can pass from the inlet 31, via the cooling area 32, to the outlet 33 are feasible by means of the four side edges of the cooling area 34, 35, 36 and 37. Two variants are illustrated in FIG. 3 as a representation. In a first variant, cooling medium flows through a cooling/heating element 30a from left to right, that is to say from the side edge 34 to the side edge 36. In a second variant, cooling medium flows through a cooling/heating element 30b from bottom to top, that is to say from the side edge 35 to the side edge 37. It goes without saying that a large number of other variants are also feasible, in particular a meandering arrangement of the cooling channels. The cooling/heating elements 30, 30a, 30b can be stacked one above the other, with a respective continuous supply and discharge line being produced by the inflows 31 and outflows 33 which come to lie one above the other. In order to ensure the leak-tightness, seals which are composed, for example, of the material of the cooling/heating element 30, 30a, 30b, an extruded seal or an inserted seal can also be provided. Finally, the cooling/heating elements 30, 30a, 30b can be adhesively bonded to one another (in groups). As a specific exemplary embodiment, FIG. 4 illustrates a plan view of a cooling/heating element 40 with an inserted or extruded seal 41.

Figure 5:
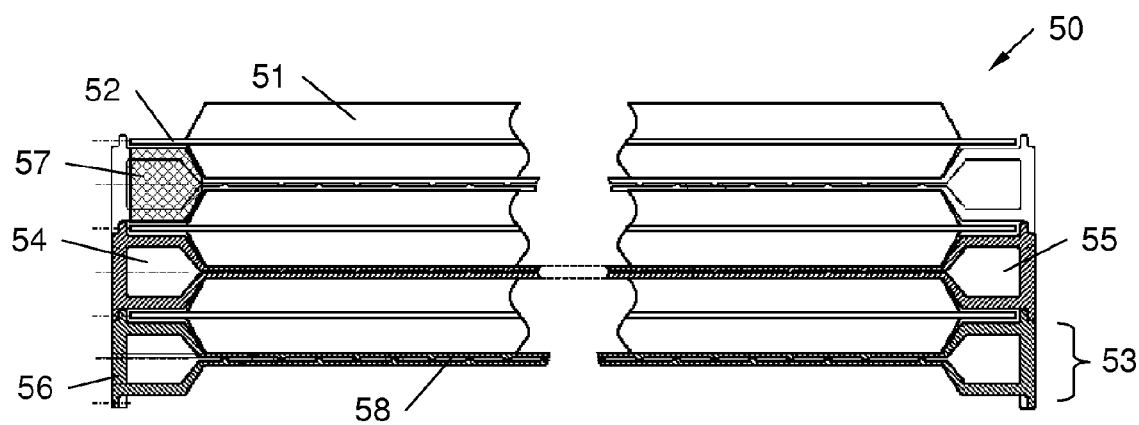
FIG. 5 illustrates a section through a stack of a plurality of individual cells with cooling/heating elements arranged therebetween.

FIG. 5 illustrates a section AA through a stack 50 of a plurality of individual cells 51 with cooling/heating elements 53 arranged therebetween. The individual cells 512 are provided with a fold 52, like in FIG. 1. The cooling/heating elements 53 have an inlet 54 and an outlet 55. In one variant of the invention, the edge 56 of the cooling/heating element 53 is designed to be so high that a specific minimum distance between the cells 51 can be ensured and the cooling areas 58 of the cooling/heating elements 53 cannot be excessively pressed together. Specifically, the cells 51 can no longer be moved further toward one another as soon as they bear, by way of their fold 52, on the edge 56 or the inlet 54 or outlet 55.

FIG. 5 also clearly illustrates how the space 57 remaining between the cells 51 can be used by the inlets 54 and outlets 55. As an alternative or in addition, spacers can be integrated in a cooling area 58 itself. In this case, the spacers can be integrated in the boundaries only on one side or on both inner sides of the cooling/heating element 53 or else be realized, for example, by a separate component (not illustrated), for example an inserted grid or mesh or flexible webs. The flexible webs 14 mentioned in respect of FIG. 1 can also be designed such that a specific residual gap width is ensured even in the case of relatively high forces which act on the cooling/heating element 53 and the webs 14 therefore also fulfill the spacer function. This is ensured in the case of the webs 14 from FIG. 1 since the tabs of the webs 14 come to lie one on the other in the case of an excessive action of force and de facto can no longer be further pressed together. Finally, the two boundaries of a cooling area can also be designed such that one is of rigid design and the other is flexibly suspended. Therefore, better, stable positioning of the cells 51 in the stack is achieved.

Fire-Resistant Insulation:

A so-called "thermal runaway" can be produced in the event of overheating, excessive charging or some other improper use. In this case, all the chemical and electrical energy which is stored in a cell 51 is converted within 5 to 25 seconds. This creates very high local temperatures of greater than 700° C. which can ignite the two adjacent cells 51 in the same module (these modules are often made up of approximately 12 cells) on account of the desired high packing density of the cells 51. If a plurality of modules are arranged next to one another in such a way that the fire ball of the first traversed cell 51 ignites one or more cells 51 of the neighboring modules, a chain reaction is produced.

In the case of a thermal runaway, the seat of the fire should as far as possible be prevented from spreading to adjacent cells 51 in the cell stack 50 or else to adjacent cell stacks. To this end, the cooling/heating elements 53 are advantageously produced from sheet metal. When a circulation pump which is connected to the cooling/heating elements 53 is running, the existing water cooling system can discharge the thermal energy produced. In order to nevertheless keep the thermal loading on the cooling/heating elements 53 as low as possible, a fire-resistant nonwoven (heat-resistant, flame-retardant or fire-resistant fabric or paper, not illustrated) can be inserted between the cells 51 and the cooling/heating elements 53. Said nonwoven can function as an additional thermal insulation against very high temperature and therefore reduces the transfer of heat from the burning cell 51 to the cooling/heating element 53 to a tolerable level. The fire can therefore be restricted to this one cell 51. During normal operation, there is no restriction or no significant restriction to the transfer of heat from the cell 51 to the cooling/heating element 53 on account of the only very low thermal power in comparison to the thermal runaway (only approximately 1% of the thermal runaway).

In this case, the heat-resistant, flame-retardant or fire-resistant layer can be all the thinner the lower the thermal conductivity of said layer. Under normal conditions, the thermal power transmitted by the cell 51 to the cooling system is less than 0.2 $kW/m^2$ and causes a temperature drop of approximately 2° C. at said layer. In the case of a thermal runaway, a thermal power of up to 20 $kW/m^2$ can occur, this causing a desired high temperature drop of approximately 200° C. at said layer. In this case, the cooling water next to the burning cell 51 is heated to 100° C., this energy is then uniformly distributed by the cooling circuit to the entire mass of the battery, without critical temperature values being reached in the process.

Figure 23:
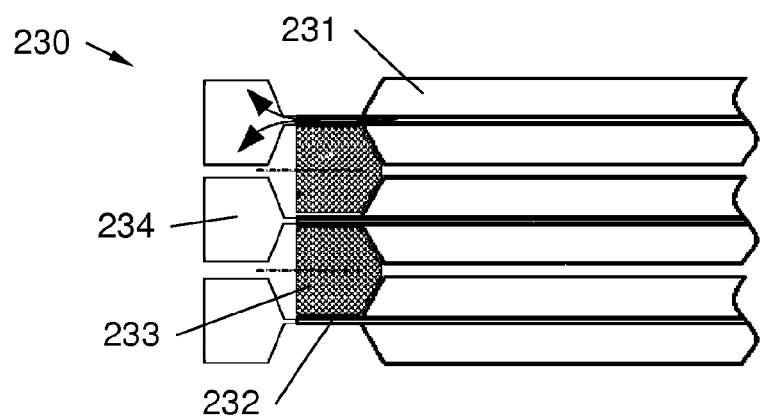
FIG. 23 illustrates a first variant of a channel for discharging hot combustion gases.
Figure 24:
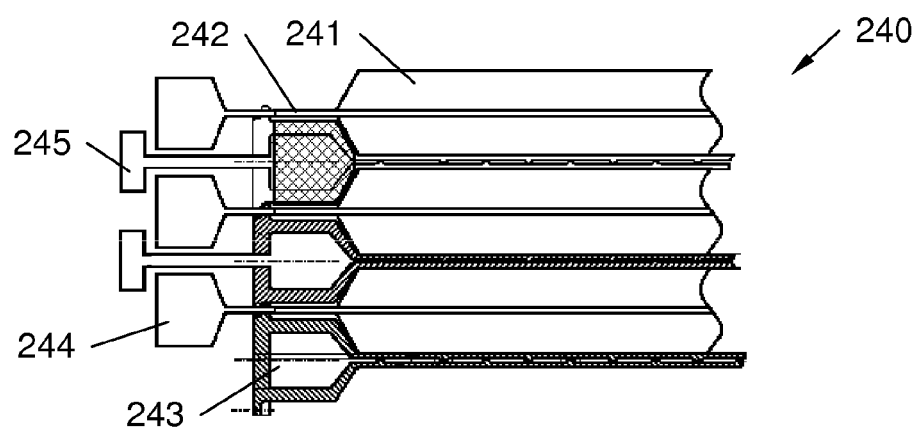
FIG. 24 illustrates a second variant of a channel for discharging hot combustion gases.

Hot combustion gases can be discharged via channels which are cooled by a cooling medium and are integrated in the sides of the cooling/heating elements 53 (not illustrated; see also FIGS. 23 and 24).

Figure 6:
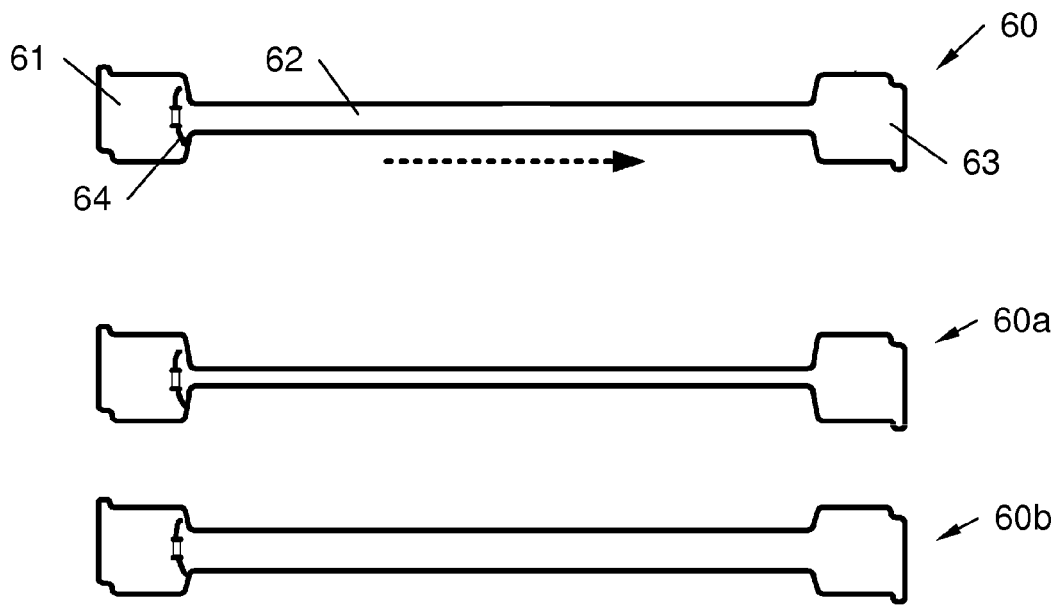
FIG. 6 illustrates a cooling/heating element with a flow diaphragm in the inlet of a cooling area.

Flow in the Cooling Area:

When the gap in the cooling area increases in size, more cooling medium flows through this gap or this capillary than through capillaries which remained narrow. This leads to a non-uniform heat discharge or supply which is undesired per se. This effect can be counteracted by providing a flow diaphragm with a constant cross section which is independent of the movement of the boundaries of the cooling/heating area. Said flow diaphragm is preferably integrated on the inlet side. In this respect, FIG. 6 illustrates a cooling/heating element 60 having an inlet 61, a cooling area 62 and an outlet 63. Furthermore, the cooling/heating element 60 comprises a flow diaphragm 64 which has an opening with a cross section which remains substantially constant irrespective of the gap width in the cooling area 62. In this respect, FIG. 6 illustrates a cooling/heating element 60a with a reduced cross section and a cooling/heating element 60b with a widened cross section. It can clearly be seen that the opening in the flow diaphragm 64, and therefore, the flow of medium through the cooling area 62, remains substantially the same.

Figure 7:
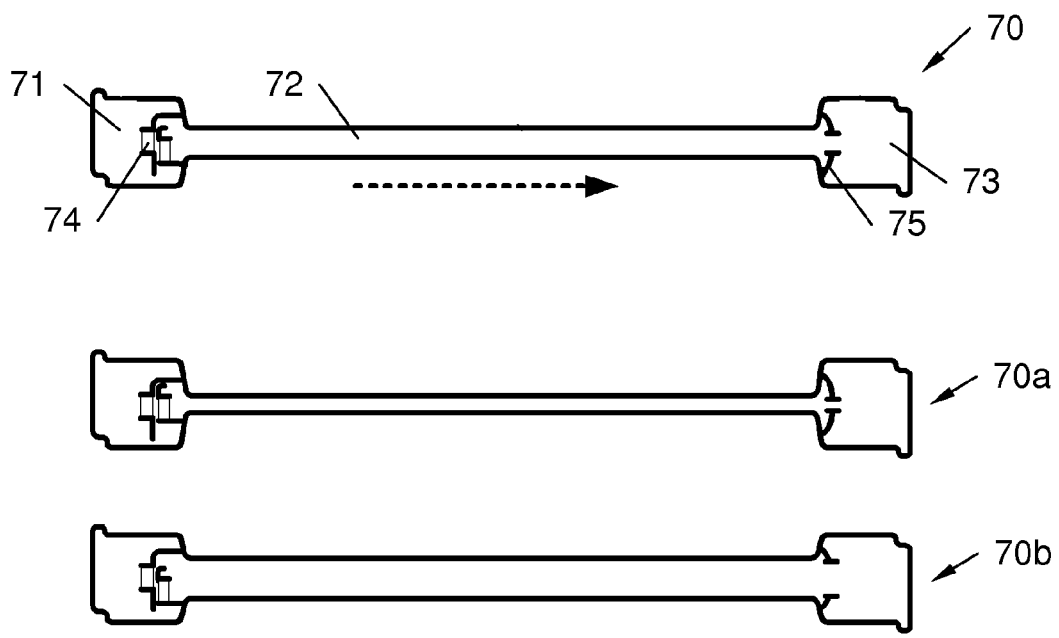
FIG. 7 illustrates a variant of a cooling/heating element with an inlet diaphragm and an outlet diaphragm.

FIG. 7 illustrates a further variant of a cooling/heating element 70 having an inlet 71 to a cooling area 72, an outlet 73, an inlet diaphragm 74 and an outlet diaphragm 75. When the gap width of the cooling area 72 is reduced, the inlet diaphragm 74 is opened further and the outlet diaphragm 75 is closed further (see cooling/heating element 70a in this respect). When the gap width of the cooling area 72 is increased in size, the inlet diaphragm 74 is constricted and the outlet diaphragm 75 is widened (see cooling/heating element 70b in this respect). This results in a relatively high pressure prevailing in a relatively narrow gap since the pressure is first reduced at the outlet diaphragm 75. However, the high pressure now has the effect of increasing the size of the gap width in the cooling/heating element 70. However, in the case of a relatively wide gap, the pressure is already reduced at the inlet diaphragm 74, and therefore a relatively low pressure prevails in the gap itself. The low pressure now reduces the gap width in the cooling/heating element 70. This results in a form of hydraulic control of the gap widths of the individual cooling/heating elements 70 which are arranged in a cell stack.

Figure 8:
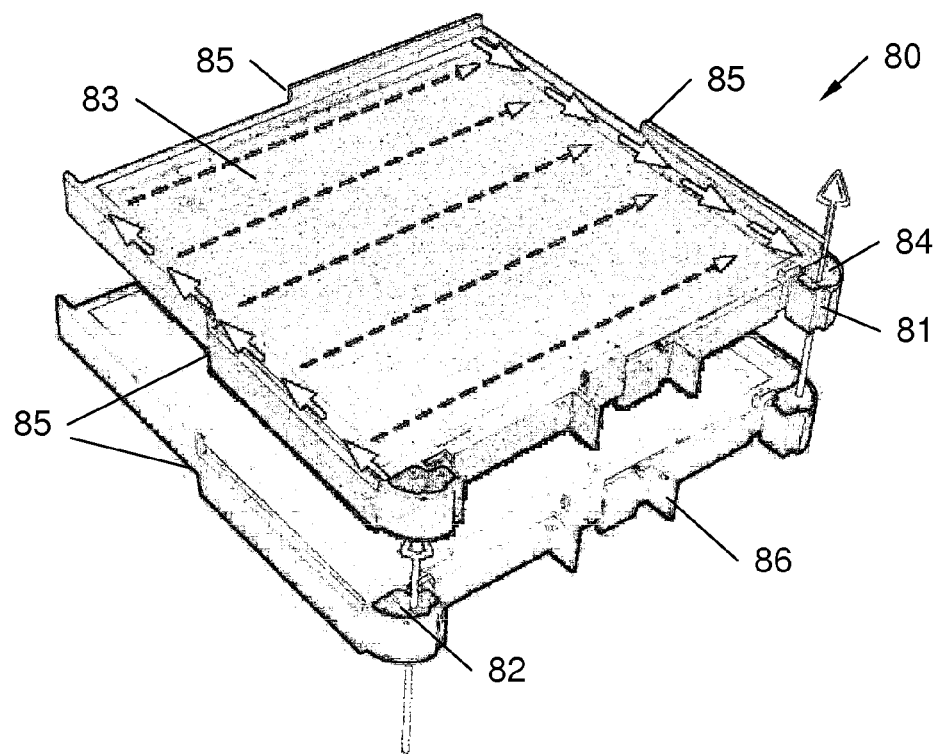
FIG. 8 illustrates a stack of two identical cooling/heating elements.

Tooth System:

FIG. 8 illustrates a stack 80 of two identical cooling/heating elements 81 (made from plastic in this case). Each cooling/heating element 81 comprises an inlet 82, a cooling surface 83 and an outlet 84. In order to hold the stack 80 together more effectively, each cooling/heating element also has a tooth system 85 which prevents the cooling/heating element 81 in the stack 80 from slipping. The tooth system 85 can preferably transmit pushing forces in every direction. Said tooth system can be arranged with an offset of one or more rows. Furthermore, the tooth system 85 is designed to be self-latching (in a non-releasable or releasable manner) in a particularly advantageous embodiment. This simplifies assembly, in particular when the individual cooling/heating elements are adhesively bonded to one another, since it is therefore possible to dispense with a separate device pressing the parts against one another until the adhesive hardens. The latching system can be designed, for example, in a trapezoidal manner. The tooth system 85 is preferably designed in a meandering manner in order to avoid notching effects. In each case only one tooth flank per side in shown in FIG. 8. However, a large number of tooth flanks are advantageously formed on each side. By way of example, the teeth are 2-5 mm wide. Finally, a cooling/heating element 81 also comprises a fastening tab 86 for a cell monitoring circuit (also see FIG. 18 in this respect). The fastening tabs 86 advantageously comprise latches for fastening purposes and coding ribs for correctly positioning the cell monitoring circuits along the cooling/heating elements 81.

In a specific embodiment, the cooling/heating elements 81 were produced from plastic, with the wall thickness at the edge having been 1.5-2 mm, and approximately 0.6 mm at the tub base. The material is durable at 6-7 $N/mm^2$ at −40° C. to 85° C. and durable and water- and/or glycol-tight at 2 bar and a temperature of −40° C. to 85° C. The plastic should advantageously also briefly and once withstand relatively high temperatures of 200° C.

Figure 9:
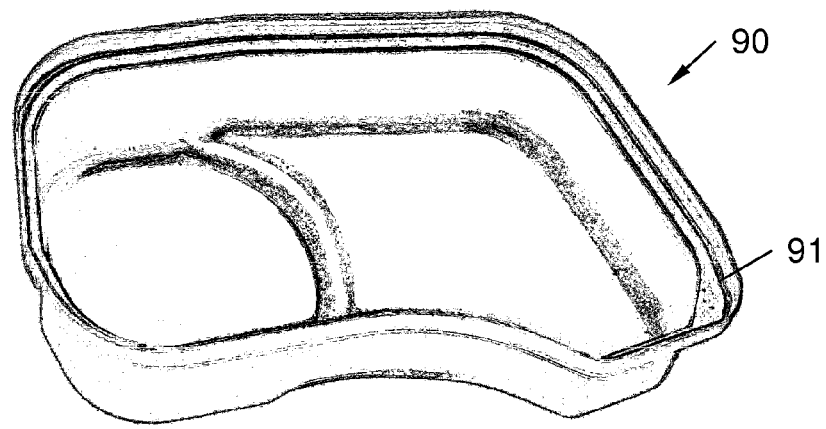
FIG. 9 illustrates a cooling/heating element which is composed of sheet metal.

FIG. 9 illustrates an alternative cooling/heating element 90 which is produced (deep-drawn) from sheet metal. In order to stack the individual cooling/heating elements 90, said cooling/heating element also comprises a seal 91. In a specific embodiment, the upper region was produced from a material with a thickness of 0.6 mm and the tub region was produced from a material with a thickness of 0.2 mm. The sheet metal is preferably provided with an anti-corrosion coating.

Cooling Medium:

The cooling medium advantageously has a high specific heat capacity, is protected against freezing, is non-corrosive to the materials used, has a low surface tension and removes contaminants (in this context, contaminants are also understood to mean dissolved gases or gas bubbles). These properties can also be achieved by adding suitable substances (for example, antifreeze, surfactants, anti-corrosion agents etc.) to one or more base substances. Since the cell stack in the shown arrangements is mounted in a floating manner, that is to say virtually "floats" in the cooling medium, the cells are protected against vibrations and instances of high acceleration. The cooling medium preferably also has a high density or is correspondingly highly pressurized. The cooling medium is advantageously in liquid form, but can of course also be in gas form.

Figure 10:
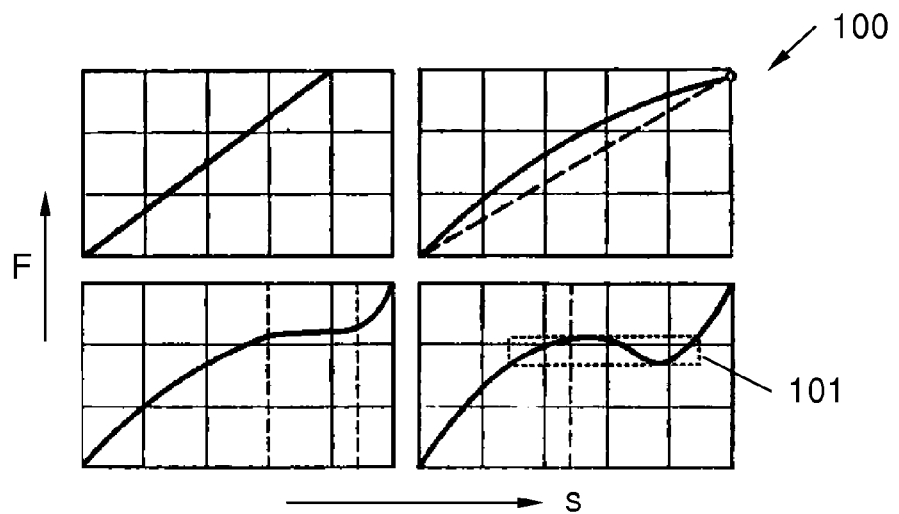
FIG. 10 illustrates spring characteristic curves of various plate springs.

Volume Compensation:

Since the thickness of a cell has tolerances and this continues to periodically change during charging or discharging, a container for volume compensation is advantageous. It is also advantageous when a container for capturing the gas bubbles which are contained in the cooling medium is also provided. Said containers can be two different containers or the same container. In order that the cells are uniformly pressurized, the entire cooling system is pressurized. This can be implemented before each instance of operation of the cells by means of a small pump which forces the cooling medium out of a reservoir container into the cooling/heating elements, or the entire system is pressurized at the manufacturing site after assembly. In order that the pressure in the case of fluctuations in temperature or a change in charging of the cells (as a result of which the thickness of the cells changes) does not change as far as possible, the volume compensation container is advantageously under mechanical pressure which is preferably realized with the aid of plate springs. Plate springs allow for suitable selection of a spring characteristic curve which generates an approximately constant force over a relatively large stroke. In this respect, FIG. 10 illustrates spring characteristic curves 100 of various plate springs. In said figure, the force F is plotted against travel s. The plate springs differ by virtue of different ratios of material thickness to height of the plate spring. A force F which is virtually constant over a relatively long travel s can be achieved by suitable selection. In this respect, the graph at the bottom right illustrates an advantageous characteristic curve region 101 which extends from approximately 25% to 90% of the spring travel s.

Figure 11:
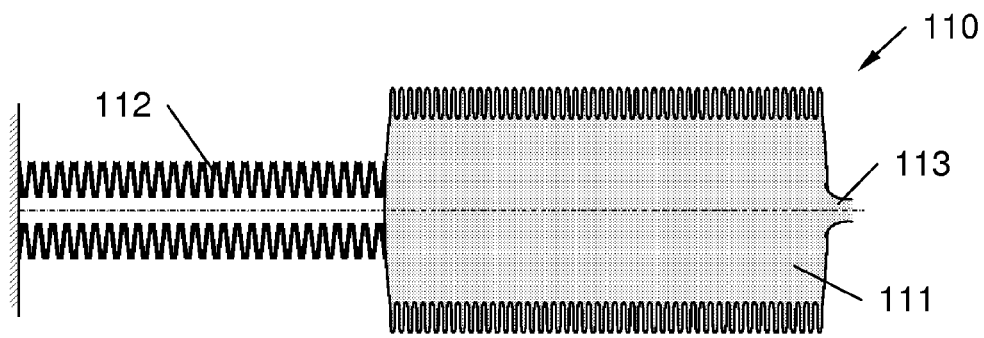
FIG. 11 illustrates a volume compensation arrangement with a flexible container.

FIG. 11 now illustrates a first variant of a volume compensation arrangement 110 comprising a flexible container 11 and a plurality of plate springs 112 which exert a more or less constant force on the container 111. An opening 113 by means of which the container 111 can be connected to the cooling circuit is located in the front region of the container 111.

Figure 12:
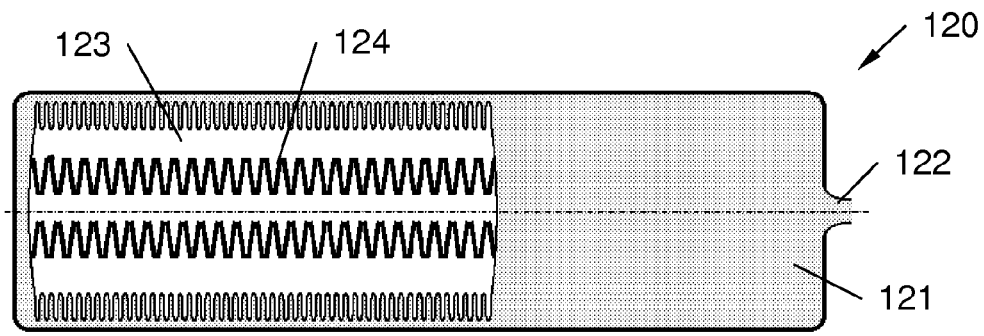
FIG. 12 illustrates a volume compensation arrangement with a rigid container.

FIG. 12 illustrates a second variant of a volume compensation arrangement 120 comprising a rigid container 121 with an opening 122 for connection to the cooling circuit. A flexible container 123 which exerts a pressure on the liquid contained in the container 121 by means of plate springs 124 is arranged in container 121. It goes without saying that it is also feasible to provide a piston, on which the plate springs 124 act, instead of the flexible container 123. In a specific embodiment, the volume compensation container was designed with a diameter of 65 mm and a length of 220 mm, this producing a volume of approximately 730 cm$^3$. The container is pressure-resistant to a nominal pressure of approximately 2 bar. Approximately 100 plate springs with a diameter of 25 mm, a height of 1.4 mm and a material thickness of 1 mm were provided for pressure generation. The plate springs can be composed of metal or plastic. The flexible container 123 was finally designed with a diameter of 63 mm and a length of 150 mm and is composed of sheet metal.

Figure 13A:
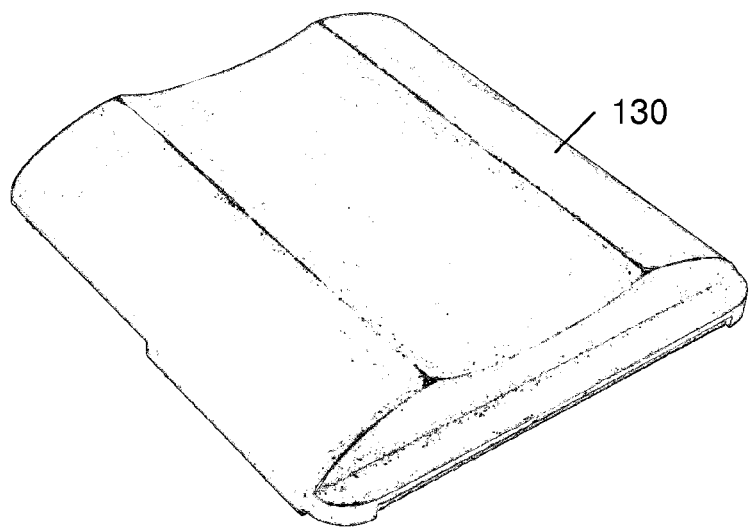
FIG. 13a illustrates a base element from below.
Figure 13B:
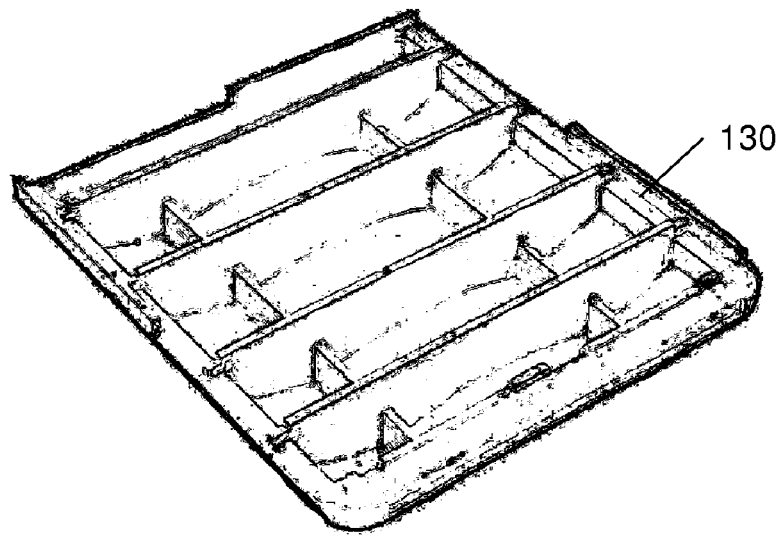
FIG. 13b illustrates a base element from above.

Base Element:

FIGS. 13*a* and 13*b* illustrate a base element 130 from below (FIG. 13*a*) and from above (FIG. 13*b*). In the assembled state, the area shown in FIG. 13*a* is on the outside and the rib structure shown in FIG. 13*b* is on the inside. The base element 130, which has a surface on the outside which is curved for suitable force distribution, is used to construct the (bundled) rechargeable battery. The surface is advantageously curved in such a way that tensioning straps which will be used later for assembly create a distribution of force which is uniform over the base area. In order for the tensioning strap to be able to be tensioned and for tensioning locks for connecting the ends of the tensioning strap to find space, the surface is concavely curved in the center. Force is also uniformly introduced into the area in this case. In the illustrated embodiment, the surface is curved only in one direction. In a further embodiment, however, the surface can also be curved in both directions, and therefore a 3D curvature is produced. The forces are routed from the surface, by ribs which are positioned directly above the tensioning straps, to the lowermost cooling/heating element. In order for force to be distributed uniformly over the surface of the lowermost cooling/heating element, an additional stiff plate which is situated between said components is advantageous. In one variant, the cover element is of identical or substantially identical construction to the base element 130.

Figure 14:
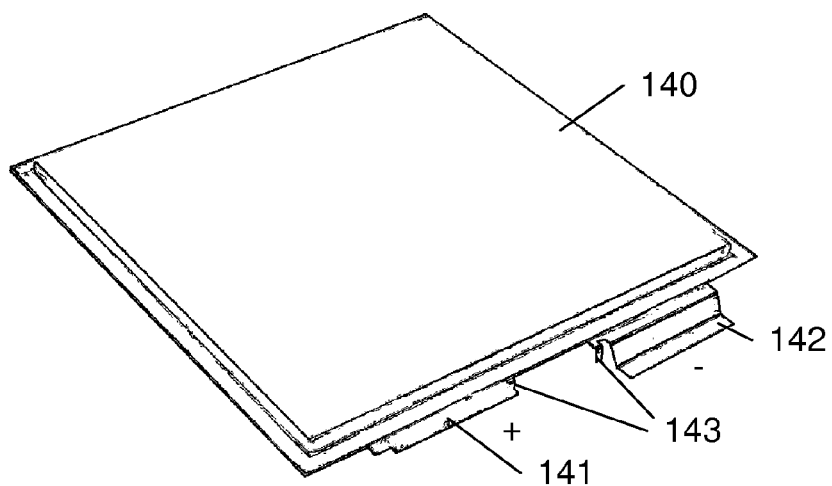
FIG. 14 illustrates a first embodiment of a cell.

Connections of the Cells:

FIG. 14 illustrates a first embodiment of a cell 140 with a positive connection 141 and a negative connection 142 by means of which the electrical power can be supplied and discharged. In addition, branches 143 by means of which an electronic circuit for monitoring the cell 140 can be connected are provided. The branches 143 can be designed as flat contacts for a subsequent conductive adhesive bond or as plug pins. The connections 141 and 142 are of bent or angled design for the connection of a plurality of cells 140. The positive connection 141 is bent upward and the negative connection 142 is bent downward in FIG. 14.

Figure 15:
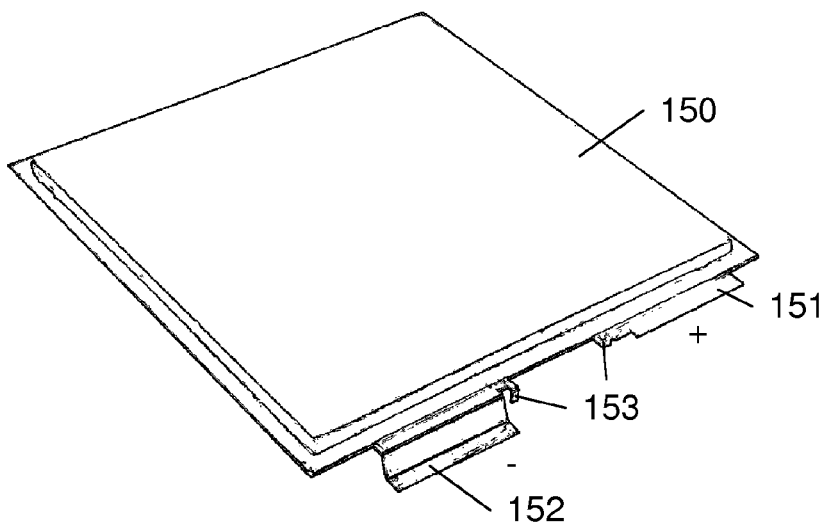
FIG. 15 illustrates a second embodiment of a cell.

In order for the cells 140 to be able to be directly connected to one another without intermediate elements, two bending variants are required, a "left-hand" and a "right-hand" variant. In this respect, FIG. 15 illustrates a cell 150 which is designed with mirror-image symmetry to cell 140 from FIG. 14. The cell 150 analogously comprises a positive connection 151 and a negative connection 152 by means of which the electrical power is supplied and discharged. The positive connection 151 is bent upward and the negative connection 152 is bent downward. In addition, branches 153 by means of which an electronic circuit for monitoring the cell 150 can be connected is again provided.

In the example illustrated, the branches 143 and 153 are arranged both at the positive connections 141 and 151 and at the negative connections 142 and 152. In the assembled state, that is to say after the cells 140 and 150 have been stacked, there are twice as many branches 143 and 153 than would be required. In an alternative embodiment, the branches 143 and 153 are therefore arranged only at the positive connections 141 and 151 or only at the negative connections 142 and 152 (this applies for the series connection of the cells 140 and 150).

The cells 140 and 150 can now be connected without further elements, for example by welding, in particular ultrasound welding or ultrasound compaction, or by chemically reactive connection. The cells 140 and 150 are intended to be connected in series. Other bending variants would have to be provided for parallel connection. A plurality of modules (that is to say a plurality of cells 140 and 150 which are connected in series) can also be connected in parallel by means of relatively long connections or with the aid of separate sheet metal bridges (for example composed of aluminum or copper).

Construction of a Bundled Rechargeable Battery

Proceeding from the base element 130 from FIGS. 13a and 13b, possibly of an additional stiff plate for more uniform distribution of the forces, a cooling/heating element 81 from FIG. 8, a cell 140 from FIG. 14, a further cooling/heating element 81 and a cell 150 from FIG. 15 are alternately stacked. Depending on requirements, this sequence of cooling/heating element 81, cell 140, cooling/heating element 81 and cell 150 can be repeated as often as desired. The stack which is obtained is stable without further measures on account of the tooth system at the edge of the cooling/heating element 81 (also see FIG. 17 in this respect). It was possible to construct stacks with a height of about 1 m without problems in experiments. However, groups of cooling/heating elements 81 (and cells 140, 150) can advantageously also be adhesively bonded to one another, in particular adhesively bonded to one another in a leak-tight manner. Modules of this kind are preferably produced in a preceding assembly step, and therefore it is only necessary to stack a few modules one on the other during final assembly of the bundled rechargeable battery.

Rechargeable Battery Disconnect Unit

Figure 16:
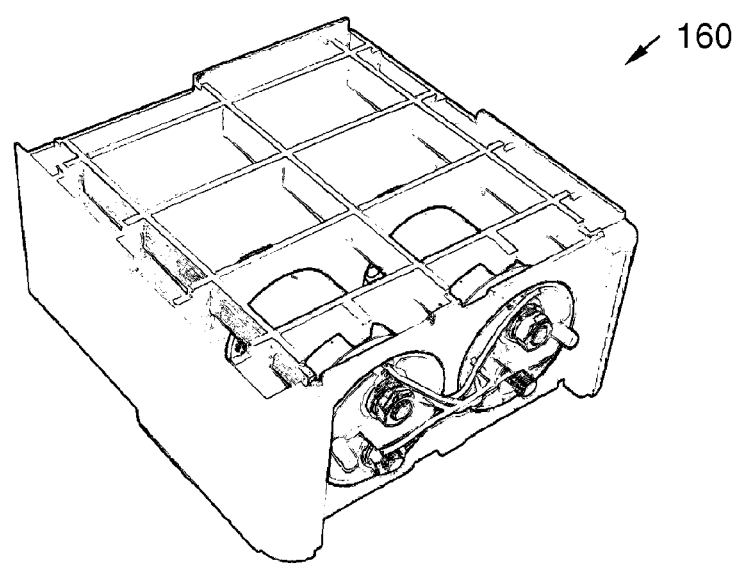
FIG. 16 illustrates a rechargeable battery disconnect unit.

FIG. 16 illustrates a rechargeable battery disconnect unit 160. Said figure clearly illustrates the reinforcing ribs in the interior of the rechargeable battery disconnect unit 160 which ensure the transmission of force between the upper and lower connecting areas. The electrical functioning of the rechargeable battery disconnect unit 160 is known per se. The rechargeable battery disconnect unit 160 is provided for electrically disconnecting the high-voltage circuit from the vehicle or other devices, which are connected to it, with the aid of relays. The rechargeable battery disconnect unit 160 also comprises a preliminary charging circuit which establishes a resistive connection between the rechargeable battery and the vehicle before the relays are actually switched in order to compensate for potential differences. Finally, the illustrated variant of the rechargeable battery disconnect unit 160 comprises current sensors and voltage sensors for measurements in the high-voltage range and for monitoring the relay function.

Figure 17:
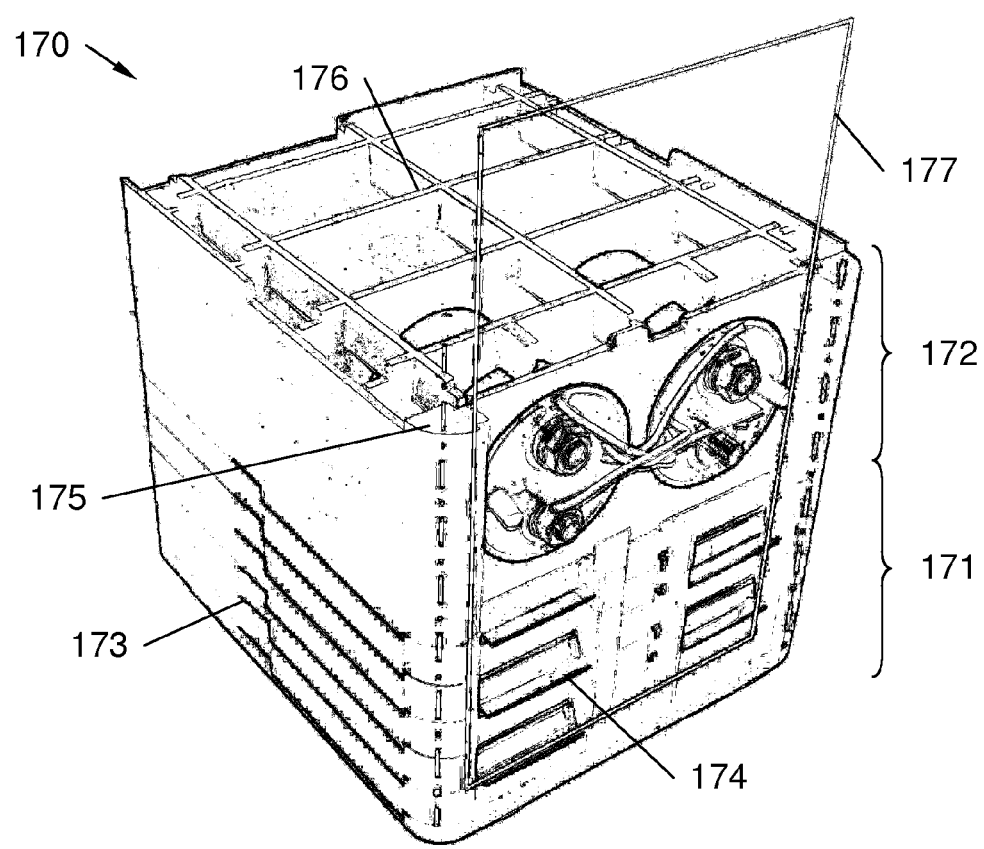
FIG. 17 illustrates an oblique view of a semi-finished bundled rechargeable battery.

FIG. 17 illustrates a semi-finished bundled rechargeable battery 170 comprising the previously obtained stack 171 and a rechargeable battery disconnect unit 172 which is mounted on said stack. The tooth system 173 of the individual cooling/heating elements and the connected contacts 174 of the individual cells can also be clearly seen. The rechargeable battery disconnect unit 172 also has a cooling channel 175, and therefore the cooling medium can flow from the cooling/heating element which is arranged beneath the rechargeable battery disconnect unit 172 to the rechargeable battery disconnect unit 172 (the axes of the cooling channels are shown in FIG. 17 for better visualization). For reinforcement purposes, the rechargeable battery disconnect unit 172 also has reinforcing ribs 176 in order to be able to pass on the sometimes high forces within the stack. All the electrical connections (both high-voltage and low-voltage connections) are advantageously arranged in one connecting plane 177, as a result of which a particularly simple electrical connection technique can be employed.

Cell Monitoring Unit (Cell Supervisor Circuit)

Figure 18:
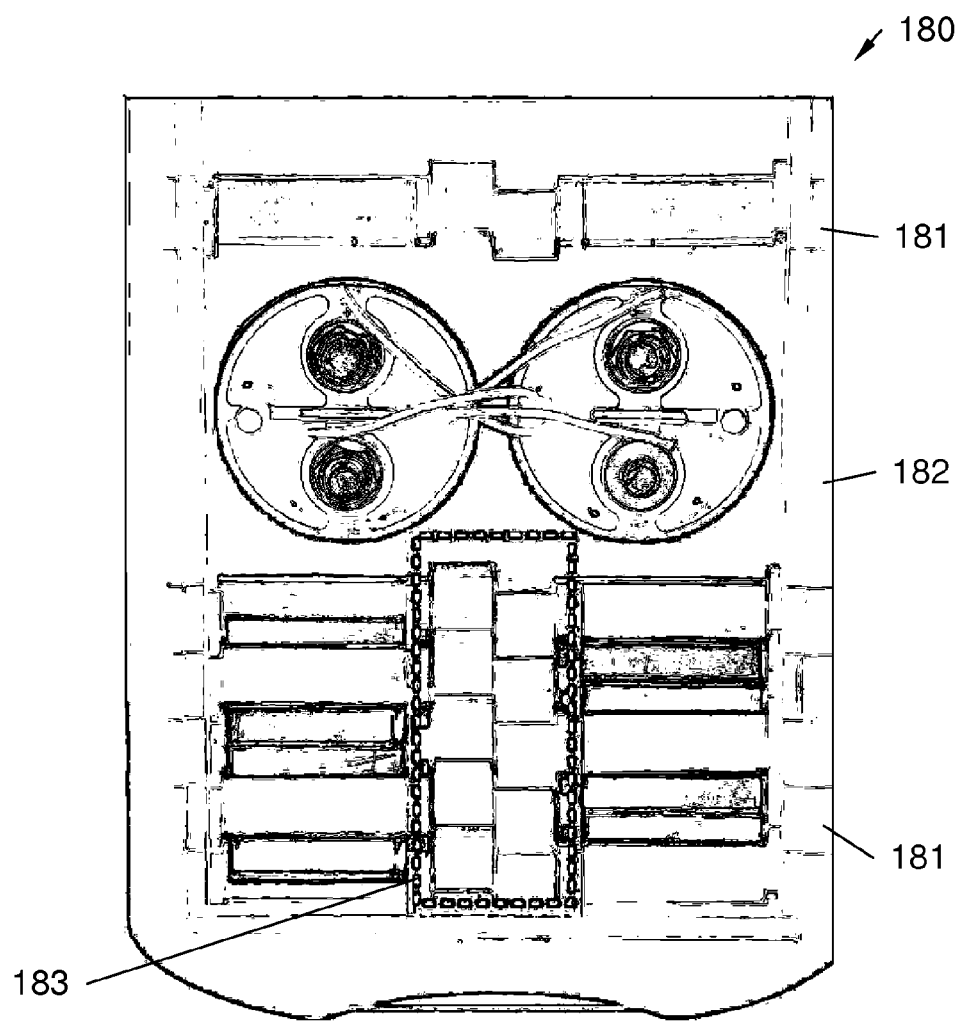
FIG. 18 illustrates a front view of a semi-finished bundled rechargeable battery.

FIG. 18 illustrates a semi-finished bundled rechargeable battery 180 comprising cooling/heating elements 181 which are stacked one on the other, a rechargeable battery disconnect unit 182 which is mounted on this stack, and also further cooling/heating elements 181. A region 183 indicates where a cell monitoring unit will later be arranged. The cell monitoring unit is positioned directly between the cell connections. This region is bordered by webs of the cooling/heating element. These webs form, provided with suitable latches, the holding means for the cell monitoring unit and advantageously contain elements which allow coding and/or secure positioning of the cell monitoring unit over the laterally situated cell branches. These cell branches are designed for conductive points of adhesion or directly for plug connection. Any adhesive bonding of the cell monitoring unit to the cell branches can be performed through large plated-through holes in the printed circuit board of the cell monitoring unit. If the cell branches are kept very short, this creates good thermal connection to the cell body, as a result of which the sensors for temperature measurement can be positioned directly on the printed circuit board of the cell monitoring unit but in the vicinity of the cell branches. As a result, a portion of the low-voltage wiring, including the plug to the cells, as required in the case of conventional systems, can be dispensed with.

On account of the short distance between the individual cell monitoring units, it is also feasible to arrange a plurality of cell monitoring units on a single (here elongate) printed circuit board. The maximum length is limited only by the thermal expansion properties of the cooling/heating element and the printed circuit boards or the maximum producible printed circuit board lengths. The cell monitoring unit serves essentially to measure the voltage and/or temperatures of the cells, to allow balancing of the cells and to ensure communication between various cell monitoring units. The connection between plurality of cell monitoring units is advantageously established by means of a connection which bridges a voltage potential, in order to avoid problems resulting from sometimes large potential differences (a stack of cells can generate several hundred volts of voltage). By way of example, the cell monitoring units can be connected in an optical manner or by means of radio. In both cases, communication can be performed in series from cell monitoring unit to cell monitoring unit, but also from each cell monitoring unit to any other desired cell monitoring unit. Star-like communication with a central control device is also feasible. It goes without saying that mixed forms are also feasible.

Rechargeable Battery Management Unit

Figure 19:
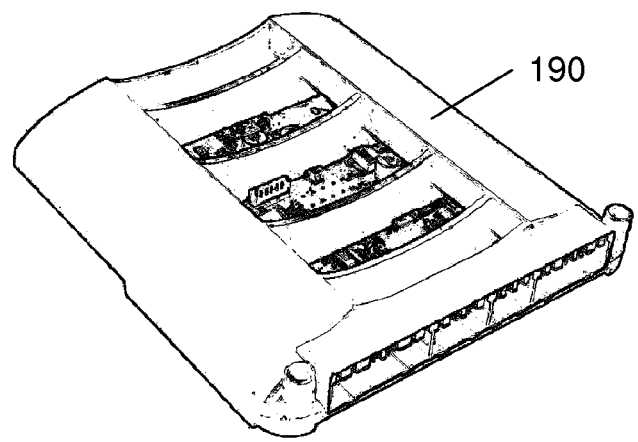
FIG. 19 illustrates a rechargeable battery management unit.

FIG. 19 illustrates a rechargeable battery management unit 190 (illustrated with an open housing here). The rechargeable battery management unit 190 is essentially provided for controlling the processes in the rechargeable battery and for enabling communication with the vehicle or another device which is connected to the rechargeable battery. To this end, in the illustrated variant, the rechargeable battery management unit 190 comprises two processors which control, for example, measurement sequences, drive relays for disconnecting the battery from the load etc.

The rechargeable battery management unit 190 (depicted without a cover for the electronics here) forms the upper termination element of the bundled rechargeable battery and is of curved design at the top, like the base element. The surface is advantageously curved in such a way that tensioning straps which will be used later for assembly create a distribution of force which is uniform over the base area. In order for the tensioning strap to be able to be tensioned and for tensioning locks for connecting the ends of the tensioning strap to find space, the surface is concavely curved in the center. Force is also uniformly introduced into the area in this case. In the illustrated embodiment, the surface is curved only in one direction. In a further embodiment, however, the surface can also be curved in both directions, and therefore a 3D curvature is produced. The forces are routed from the surface, by ribs which are positioned directly beneath the tensioning straps, to the element which is situated beneath the rechargeable battery management unit 190. In order for force to be distributed uniformly over this element, an additional stiff plate which is situated between said components is advantageous.

The element which is situated beneath the rechargeable battery management unit 190 is preferably a cooling/heating element (for example as is known from FIG. 8). An electronic circuit of the rechargeable battery management unit 190 or the printed circuit board of said electronic circuit is pressed against the cooling/heating element by means of webs or ribs in the housing of said rechargeable battery management unit, and therefore optimum heat transfer can take place. In particular, the rechargeable battery management unit 190 can therefore also contain power circuits. The rechargeable battery management unit 190 can be externally connected by means of a plug strip which advantageously lies in the same plane as other contacts of the rechargeable battery (specifically in the connecting plane 177 from FIG. 17). The plug strip of the rechargeable battery management unit 190 is advantageously used directly for the low-voltage connection of the bundled rechargeable battery and, to this end, has at least one plug chamber (not depicted) which lies in said plane in order to allow the internal low-voltage connections. Even though the rechargeable battery management unit 190 as illustrated in FIG. 19 advantageously lies on the upper face of the bundled rechargeable battery, it goes without saying that said rechargeable battery management unit can also be designed as a module which is situated in the interior of the bundled rechargeable battery.

Module with Current Sensor, Fuse and High-Voltage Plug

Figure 20:
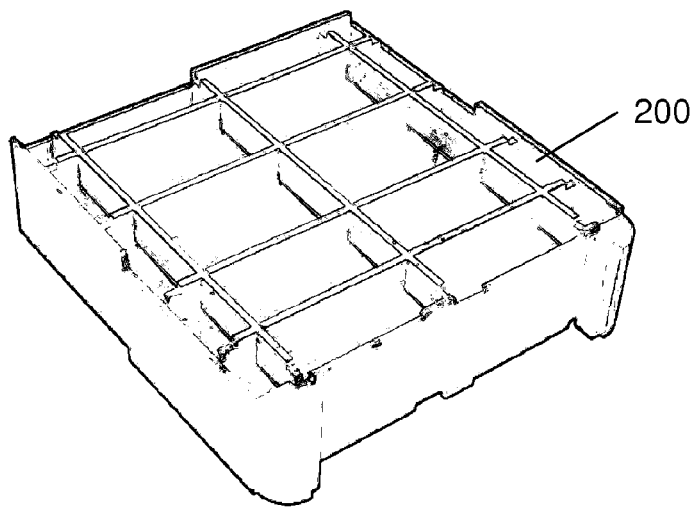
FIG. 20 illustrates a safety module with additional current sensors and high-voltage plugs.

FIG. 20 illustrates a fuse module 200 (depicted without the associated electronics here) which additionally comprises current sensors and high-voltage plugs. In the event of a distributed system (that is to say a combination of several bundled rechargeable batteries), a physically identical fuse module 200 is incorporated in each of the individual bundled rechargeable batteries in order to be able to protect each bundled rechargeable battery separately in the event of a short. The current sensor can also be accommodated in another module (in particular in the rechargeable battery disconnect unit illustrated in FIG. 16).

Figure 21:
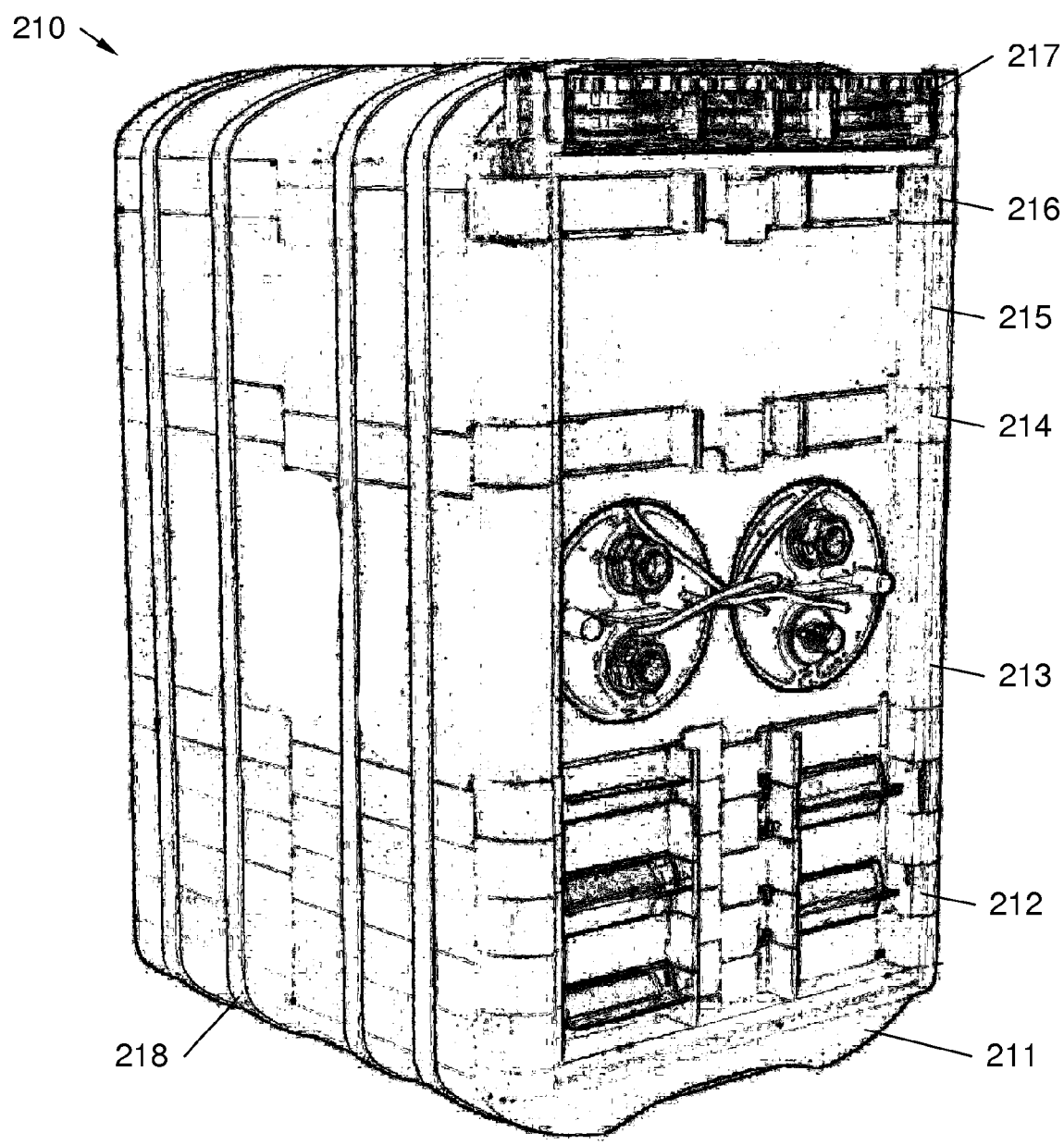
FIG. 21 illustrates an oblique view of a finished bundled rechargeable battery.

Tensioning Straps:

FIG. 21 now illustrates a finished bundled rechargeable battery 210 comprising a base element 211, a plurality of cooling/heating elements 212 with internal cells (not illustrated), a rechargeable battery disconnect unit 213, a further cooling/heating element 214, a fuse module 215 additionally containing current sensors and high-voltage plugs, a further cooling/heating element 216 and a rechargeable battery management unit 217. In the example shown, the entire arrangement is held together by tensioning straps 218 (by 4 tensioning straps 218 here). For tensioning purposes, the tensioning straps 218 have tensioning locks which are advantageously routed beneath the base element 211 or above the rechargeable battery management unit 217.

The tensioning straps can be composed of rubber, steel, plastic or fiber-reinforced plastic. The selection of material is dependent on the forces to be transmitted and on the properties of thermal expansion of the straps and of the module combination, that is to say the expansion properties of the tensioning straps 218 should be matched to the expansion behavior of the module combination. The tensioning straps 218 transmit the pressing force of the cells from the base element 211 to the upper end plate (in the form of the rechargeable battery management unit 217 here). In addition, forces are transmitted which act via the toothed edges of the cooling/heating element 212, 214 and 216 and provide the module combination, which is merely plugged together, with a degree of prestress and the required stability.

The outer edges of the individual components form a strong, prestressed, fixed housing for the rechargeable battery. The boundaries or walls of the cooling areas of the cooling/heating elements 212, 214 and 216 (also see FIG. 5 in this respect) form an inner reinforcement of the housing. A usual number of approximately 50 cells for a bundled rechargeable battery 210 produce 100 walls (2 per cell) transversely through the rechargeable battery 210, and therefore an extremely rigid yet lightweight housing is produced, similarly to a hull of a marine vessel or a fuselage of an aircraft which is reinforced by bulkheads or frames. The tensioning straps 218 can be recessed in the surface of the circumference of the housing in order to be protected (recess in the surface of the module combination). For the sake of better illustration, a cover on the front face of the rechargeable battery 210, which cover performs the task of contact protection and sealing, has not yet been fitted.

The length of the tensioning straps 218 can be changed very easily, and therefore a large number of different types of bundled rechargeable batteries 210 can be produced very easily from the individual components. It goes without saying that other fastening options are nevertheless also feasible. For example, the rechargeable battery can be screwed. Threaded rods, of which the length can likewise be easily matched to various conditions, are particularly suitable here. These threaded rods are, for example, pushed through holes in the modules. In this case, they are fastened by nuts. However, it is also feasible for bridges to be provided above and below the bundled rechargeable battery 210, said bridges having holes for said threaded rods at their ends and in this way holding the bundled rechargeable battery 210 together.

Figure 22:
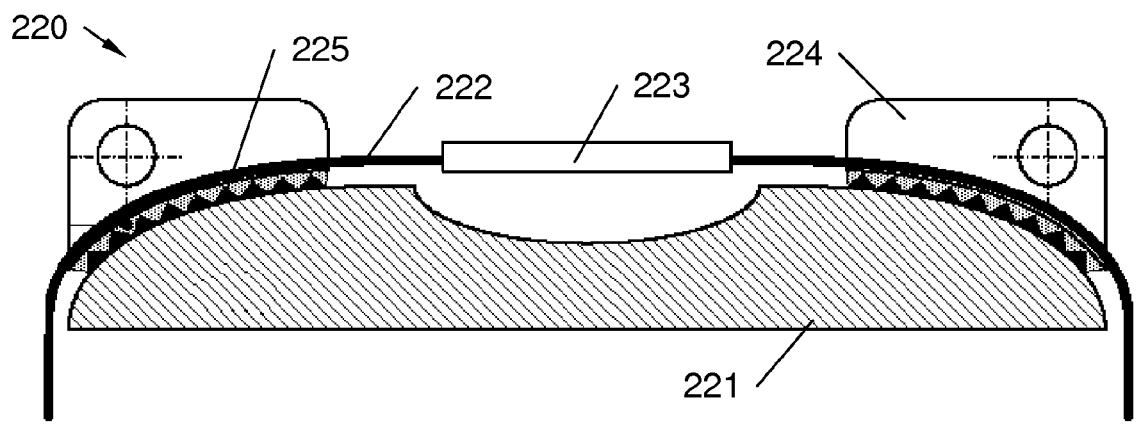
FIG. 22 illustrates the upper region of a bundled rechargeable battery with fastening tabs.

Fastening Points of the Bundled Rechargeable Battery:

In order to be able to mount the bundled rechargeable battery in a vehicle or another device which is to be supplied with energy, suitable fastening points are required on the bundled rechargeable battery. To this end, FIG. 22 illustrates the upper region of a bundled rechargeable battery 220, specifically a cover 221 around which a tensioning strap 222 with a tensioning lock 223 is placed. Fastening tabs 224 are inserted between the cover 221 and the tensioning strap 222, said fastening tabs enabling the bundled rechargeable battery 220 to be fastened in, for example, a vehicle. The cover 221 and/or the tabs 224 advantageously have a tooth system 225 for this purpose, said tooth systems preventing or at least reducing slipping between said cover and tabs. It goes without saying that it is also possible, in addition or as an alternative, to provide tabs on the lower face of the bundled rechargeable battery 220. It goes without saying that it is also feasible for the tabs to be constituent parts of the base or cover of the bundled rechargeable battery 220 or to be fitted in some other way, for example by screwing. In particular, the tabs 224 can be arranged between the cover 221 and the bridge mentioned in relation to FIG. 21.

Discharge of Hot Combustion Gases:

FIG. 23 illustrates a further detail of a stack 230 of individual cells 231 which each have a fold 232 at their edge, said stack being very similar to the stack 20 from FIG. 2. The space 233 between the cells 231 is once again used for the supply and discharge of a cooling medium. In this variant however, an additional channel 234 which is cooled by a cooling medium is provided for discharging hot combustion gases.

FIG. 24 illustrates a section through a stack 240 of a plurality of individual cells 241 with cooling/heating elements 243 arranged therebetween, said stack being very similar to the stack 50 from FIG. 5. The individual cells 241 are once again provided with a fold 242. In this variant, an additional channel 244 which is cooled by a cooling medium is likewise provided for discharging hot combustion gases. In order for the combustion gases to escape into the channel 244, openings are provided between the end face of the fold 242 and the channel 244 in the edge of the cooling/heating elements 243. By way of example, the edge of the cooling/heating elements 243 is shaped in the form of a battlement. Further connecting channels 245 to the cooling/heating elements 243 are provided in FIG. 24. However, this is to be regarded as being merely exemplary; it goes without saying that other refinements of the cooling/heating elements 243 and of the channel 244 are also feasible. It is also possible for the channels of the cooling/heating elements 243 and the channel 244 to not be of separate design, but rather to be of joint design.

Finally, it should be noted that some of the illustrations in the figures are not to scale. Furthermore, the individual variants illustrated in the figures can also form the subject matter of an independent invention.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cooling/heating element for a rechargeable battery, the cooling/heating element comprising:
a cooling area having a first boundary which physically contacts a first cell of the rechargeable battery, and a second boundary which physically contacts a second cell of the rechargeable battery, wherein the cooling/heating element is arranged in a stack and each cooling/heating element having at least one of an inlet and an outlet which interacts with at least one of an inlet and an outlet of an adjacent cooling/heating element in the stack, wherein the first and second boundaries are elastically connected to each other for movement relative thereto; and
a flow diaphragm at the edge of the cooling area, the flow diaphragm configured to restrict flow of a cooling/heating medium through the inlet as a distance between the first boundary and the second boundary increases.

2. A cooling/heating element of claim 1, wherein the at least one of the inlet and the outlet interacts directly with the at least one of the inlet and the outlet of the adjacent cooling/heating element.

3. A cooling/heating element of claim 1, wherein the first boundary and the second boundary are elastically connected to one another.

4. A cooling/heating element of claim 1, further comprising elastic webs which connect the first boundary and the second boundary, the elastic webs being provided in an interior of the cooling/heating element in a region of the cooling area.

5. A cooling/heating element of claim 4, wherein the elastic webs run in a straight line from the first boundary to the second boundary.

6. A cooling/heating element of claim 4, wherein the elastic webs have curved regions.

7. A cooling/heating element of claim 6, wherein the elastic webs have a meandering cross-section.

8. A cooling/heating element of claim 4, wherein the elastic webs run obliquely from the first boundary to the second boundary.

9. A cooling/heating element of claim 1, further comprising spacer protrusions in a region of the cooling area.

10. A cooling/heating element of claim 1, further comprising a rigid edge which is elastically connected to the first boundary and the second boundary.

11. A cooling/heating element of claim 10, wherein the rigid edge is at least as high as a cell, the thickness of the first boundary and the second boundary and a minimum distance between the first boundary and the second boundary.

12. A cooling/heating element of claim 1, further comprising a tooth system at the respective surfaces of the first boundary and the second boundary and which are provided for stacking.

13. A cooling/heating element of claim 1, further comprising at least one channel which is cooled by a cooling medium, for discharging hot combustion gases from a cell.

14. A cooling/heating element for a rechargeable battery having a first cell and a second cell, the cooling/heating element comprising:
a cooling area having a first boundary which physically contacts the first cell and a second boundary which physically contacts the second cell, wherein the cooling/heating element is arranged in a stack and each cooling/heating element having at least one of an inlet and an outlet which interacts with at least one of an inlet and an outlet of an adjacent cooling/heating element in the stack;
elastic webs which connect the first boundary and the second boundary for movement relative to each other;
at least one channel which is cooled by a cooling medium, for discharging hot combustion gases from the first cell and the second cell; and
a flow diaphragm at the edge of the cooling area, the flow diaphragm configured to restrict an outlet of a cooling/heating medium as a distance between the first boundary and the second boundary decreases.

15. A rechargeable battery, comprising:
a stack of cells;
a cooling/heating element arranged in the stack between adjacent cells in the stack, the cooling/heating element having a cooling area with an inlet and an outlet, a first boundary which is elastically connected to a second boundary for movement relative thereto, and a gap between the first boundary and the secondary boundary;
an inlet diaphragm at the inlet of the cooling area; and
an outlet diaphragm at the outlet of the cooling area.

16. A rechargeable battery of claim 15, wherein a size of the inlet diaphragm is increased and a size of the outlet diaphragm is decreased when the gap width of the cooling area is reduced.

17. A rechargeable battery of claim 15, wherein a size of the inlet diaphragm is decreased and a size of the outlet diaphragm is increased when the gap width of the cooling area is increased.

* * * * *